(12) United States Patent
Clark et al.

(10) Patent No.: US 11,669,493 B2
(45) Date of Patent: *Jun. 6, 2023

(54) GENERATING FILE USAGE INFORMATION

(71) Applicant: Red Hat, Inc., Raleigh, NC (US)

(72) Inventors: Bryan William Clark, Westford, MA (US); Robert Sanford Havoc Pennington, North Chelmsford, MA (US); Colin Walters, Westford, MA (US); Marina Zhurakhinskaya, Cambridge, MA (US)

(73) Assignee: Red Hat, Inc., Raleigh, NC (US)

(*) Notice: Subject to any disclaimer, the term of this patent is extended or adjusted under 35 U.S.C. 154(b) by 182 days.

This patent is subject to a terminal disclaimer.

(21) Appl. No.: 16/949,039

(22) Filed: Oct. 9, 2020

(65) Prior Publication Data
US 2021/0026811 A1    Jan. 28, 2021

Related U.S. Application Data

(63) Continuation of application No. 15/953,711, filed on Apr. 16, 2018, now Pat. No. 10,803,017, which is a
(Continued)

(51) Int. Cl.
*G06F 16/00* (2019.01)
*G06F 16/17* (2019.01)
(Continued)

(52) U.S. Cl.
CPC .......... *G06F 16/1734* (2019.01); *G06F 7/36* (2013.01); *G06F 16/10* (2019.01); *G06F 16/14* (2019.01);
(Continued)

(58) Field of Classification Search
CPC .. G06F 16/10–11; G06F 16/119; G06F 16/14; G06F 16/148; G06F 16/16;
(Continued)

(56) References Cited

U.S. PATENT DOCUMENTS 5,706,510 A    1/1998  Burgoon
6,021,508 A *  2/2000  Schmuck ............ G06F 16/1858
                                                       714/20
(Continued)

FOREIGN PATENT DOCUMENTS

WO    WO2007008590 A2 *  1/2007
WO    WO2007109249 A2 *  9/2007
WO    WO2008072093 A2 *  6/2008

OTHER PUBLICATIONS

A. da Silva et al., "Mining Web Usage Data for Discovering Navigation Clusters", 11th IEEE Symposium on Computers and Communications (ISCC'06), Jun. 2006, pp. 1-6.*
(Continued)

*Primary Examiner* — Srirama Channavajjala
(74) *Attorney, Agent, or Firm* — Lowenstein Sandler LLP

(57) ABSTRACT

Embodiments relate to systems and methods for tracking local and remote file usage, and aggregating the resulting file usage statistics for presentation to a user. The operating system of a local computer can cause presentation of a merged list of unified file usage information, wherein the merged list of unified file usage information comprises a first representation of the local file associated with local file usage information and a second representation of a Web application file associated with remote file usage information from a remote network host. The operating system can further receive a selection of at least one of the local file or the Web application file from the merged list of unified file usage information, determine, using saved preference information, a default application with which to open the at least one of the local file or the Web application file, and, responsive to a request, open the at least one of the local file or the Web application file with an application other than the default application.

11 Claims, 5 Drawing Sheets

Related U.S. Application Data continuation of application No. 11/948,708, filed on Nov. 30, 2007, now Pat. No. 9,946,722.

(51) Int. Cl.
*G06F 7/36* (2006.01)
*G06F 16/10* (2019.01)
*G06F 16/14* (2019.01)
*G06F 16/54* (2019.01)
*G06F 16/16* (2019.01)
*G06F 16/182* (2019.01)

(52) U.S. Cl.
CPC .......... *G06F 16/168* (2019.01); *G06F 16/182* (2019.01); *G06F 16/54* (2019.01)

(58) Field of Classification Search
CPC .... G06F 16/162; G06F 16/164; G06F 16/168; G06F 16/1873; G06F 16/214; G06F 16/219; G06F 16/182; G06F 16/244; G06F 16/958; G06F 16/178; G06F 16/1734; G06F 16/36; G06F 16/54
See application file for complete search history.

(56) References Cited

U.S. PATENT DOCUMENTS

| | | | |
|---|---|---|---|
| 6,081,840 A | 6/2000 | Zhao | |
| 6,148,294 A | 11/2000 | Beyda et al. | |
| 6,151,609 A | 11/2000 | Truong | |
| 6,226,652 B1 * | 5/2001 | Percival | G06F 8/71 707/999.203 |
| 6,243,450 B1 | 6/2001 | Jansen et al. | |
| 6,449,604 B1 | 9/2002 | Hansen et al. | |
| 6,601,067 B1 * | 7/2003 | Hiyoshi | G06F 7/36 |
| 6,618,736 B1 * | 9/2003 | Menage | G06F 11/1435 |
| 6,823,344 B1 | 11/2004 | Isensee et al. | |
| 6,862,604 B1 | 3/2005 | Spencer et al. | |
| 7,124,272 B1 * | 10/2006 | Kennedy | G06F 3/0643 711/173 |
| 7,272,782 B2 * | 9/2007 | Sneh | G06F 40/174 715/205 |
| 7,346,613 B2 | 3/2008 | Hurst-Hiller et al. | |
| 7,376,654 B1 * | 5/2008 | Chau | G06F 11/0769 709/224 |
| 7,506,314 B2 * | 3/2009 | Kollmann | G06F 11/3476 714/45 |
| 7,509,632 B2 * | 3/2009 | Boger | G06F 11/3612 717/133 |
| 7,533,116 B2 | 5/2009 | Lacy | |
| 7,720,892 B1 * | 5/2010 | Healey, Jr. | G06F 11/1471 707/831 |
| 7,912,822 B2 * | 3/2011 | Bethlehem | H04L 63/102 707/705 |
| 8,099,758 B2 * | 1/2012 | Schaefer | H04L 63/08 726/1 |
| 8,364,733 B2 * | 1/2013 | Dutta | G06F 16/9535 707/723 |
| 8,504,597 B2 * | 8/2013 | Pitts | G06F 16/24578 707/827 |
| 2001/0044705 A1 | 11/2001 | Vardi et al. | |
| 2001/0044829 A1 * | 11/2001 | Lundberg | G06Q 10/107 719/329 |
| 2002/0087883 A1 * | 7/2002 | Wohlgemuth | G06F 8/65 726/29 |
| 2002/0178271 A1 * | 11/2002 | Graham | H04L 63/101 709/229 |
| 2003/0083999 A1 | 5/2003 | Ramachandran et al. | |
| 2003/0220998 A1 * | 11/2003 | Jennings, III | G06F 16/958 709/224 |
| 2004/0049571 A1 | 3/2004 | Johnson et al. | |
| 2004/0088276 A1 | 5/2004 | Elder et al. | |
| 2004/0162853 A1 * | 8/2004 | Brodersen | G06F 16/178 |
| 2004/0255048 A1 | 12/2004 | Lev Ran et al. | |
| 2005/0004879 A1 | 1/2005 | Mathias et al. | |
| 2005/0027757 A1 * | 2/2005 | Kiessig | G06F 16/10 |
| 2005/0033777 A1 | 2/2005 | Moraes et al. | |
| 2005/0071741 A1 | 3/2005 | Acharya et al. | |
| 2005/0177580 A1 | 8/2005 | Hilbert et al. | |
| 2005/0188051 A1 | 8/2005 | Sneh | |
| 2005/0192966 A1 | 9/2005 | Hilbert et al. | |
| 2005/0216466 A1 | 9/2005 | Miyamoto et al. | |
| 2006/0155782 A1 | 7/2006 | Berstis et al. | |
| 2006/0161511 A1 * | 7/2006 | Berstis | H04L 67/535 |
| 2006/0173818 A1 | 8/2006 | Berstis et al. | |
| 2006/0242638 A1 | 10/2006 | Lew et al. | |
| 2006/0259949 A1 * | 11/2006 | Schaefer | G06F 16/122 726/1 |
| 2007/0033588 A1 * | 2/2007 | Landsman | H04L 51/08 707/E17.119 |
| 2007/0174347 A1 | 7/2007 | Wenn et al. | |
| 2007/0198363 A1 * | 8/2007 | Quoc | G06F 16/951 705/26.1 |
| 2007/0198713 A1 * | 8/2007 | Tsao | H04L 45/04 709/225 |
| 2008/0033919 A1 | 2/2008 | Arrouye et al. | |
| 2008/0065645 A1 | 3/2008 | Eichhorn | |

OTHER PUBLICATIONS

S. Chaudhuri et al., "Index merging", Proceedings 15th International Conference on Data Engineering, Mar. 23-26, 1999, pp. 1-8.*

* cited by examiner

GENERATING FILE USAGE INFORMATION

RELATED APPLICATION

This application is a continuation of U.S. patent application Ser. No. 15/953,711, filed Apr. 16, 2018, now U.S. Pat. No. 10,803,017, which is a continuation of U.S. patent application Ser. No. 11/948,708, filed Nov. 30, 2007, now U.S. Pat. No. 9,946,722, the entire contents of each of which are hereby incorporated by reference herein.

FIELD

The present invention relates to techniques for generating file usage information, and more particularly to systems and methods for aggregating local and remote file usage information for presentation to a user.

BACKGROUND OF RELATED ART

Operating systems, applications, and other software can track file usage information and present that data to a user. Many operating systems, for example, allow a user to select a view into their hard drive or other storage where individual files are sorted according to their most recently used time and date, or by other usage data. Similarly, some Web-based applications or services, such as Web-based email services or document storage services, can maintain a record of files accessed and used by a user. Web-based applications or services can likewise display or transmit a most-recently used (MRU) file list or other usage parameters to a user summarizing file usage at that site. The user can use those separate lists of information to keep track of the documents and other files that he or she is working on.

Presenting a user with separate lists of local and remote file usage can, however, be of limited usefulness to the user in practical terms. For example, a user may be working heavily on a Web word processing document, such as a letter, while they work less intensively on a spreadsheet file and a slideshow file stored on their local computer. If a list of most recently used local files is presented to a user via an operating system or utility, the user may be presented with a list at the top of which the spreadsheet and slideshow files are enumerated. The user may not be able to compare that local usage list to their remote usage data on the word processing document. If the user requests an update to their remote usage information via the Web application or service, the word processing document can be presented at the top of that list, in isolation.

However no meaningful comparison can be made between the files populating the remote usage list and the local usage list, since those lists are separately generated and ordered. The user may therefore have to manually remember, compare, or search two separate lists of data to identify a most-recently or most-heavily used file, or locate a specific file. It may be desirable to provide methods and systems to aggregate both local and remote file usage to present the user with a unified view of their file access and usage history.

DESCRIPTION OF THE DRAWINGS

The accompanying drawings, which are incorporated in and constitute a part of this specification, illustrate embodiments of the invention and together with the description serve to explain the principles of the invention. In the figures.

DESCRIPTION OF EMBODIMENTS

Embodiments relate to systems and methods for creating a unified list of a user's local and remote files, sorted according to file activity. More particularly, a file usage aggregator module can be configured to retrieve usage statistics of a user at a local computer. For instance, the file usage aggregator module can retrieve the usage statistics for the user's files on a local computer under the resident operating system of the local computer. The file usage aggregator module can also retrieve usage statistics of the user at a third party Web service or application. For example, the user's remote files may be hosted at a Web application or service such as Google™Docs, an email server, a media sharing site, or other Web service, application, or host. The history and usage statistics for the respective remote files can be maintained by the associated Web site or other network host. Given user credentials for the remote application or service, the file usage aggregator module can retrieve the remote file usage statistics from one or more remote hosts via a Web API (application programming interface) or other interface. The file usage aggregator module can then present a single view of usage characteristics of files from both local and remote sources. The file usage aggregator module can rank local and remote files based on a most-recently used (MRU) or other algorithm, in a unified list that interleaves local and remote files in order of usage. The file usage aggregator module can, in some embodiments, include a search function to perform a unified search for files by file name or content, from both the local and remote sources. The file usage aggregator module can display annotated information for each file in the unified file usage list, for example showing the file name, last time of access, or other information.

Advantages of the combined file view generated by the file usage aggregator module include the ability to assist the user in determining which local files they can move to online sites, or which remote files they may wish to backup locally. Moving files online allows the user to access those files from multiple clients. Backing up remote files to local storage can be useful if the user is planning to work with those files in a location with no network access, such as on an airplane or some hotels.

Reference will now be made in detail to exemplary embodiments of the invention, which are illustrated in the accompanying drawings. Where possible the same reference numbers will be used throughout the drawings to refer to the same or like parts.

Figure 1:
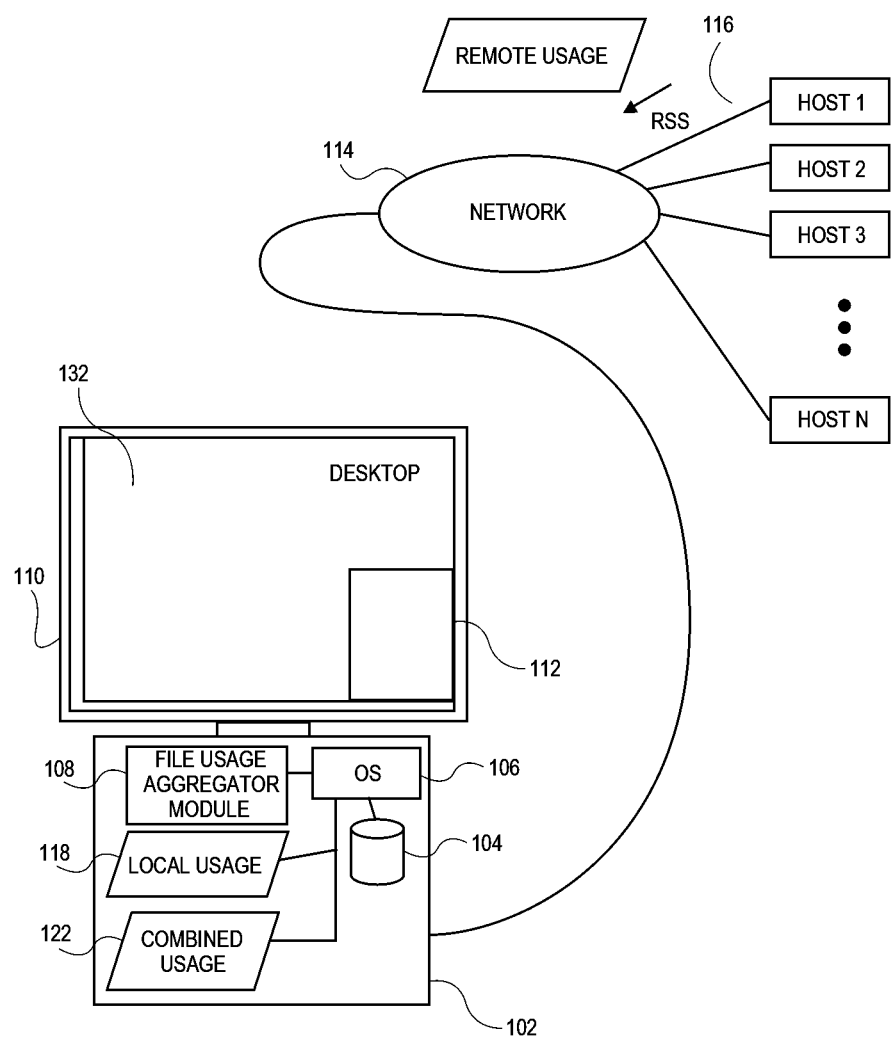
FIG. 1 illustrates an overall system for file usage processing, according to various embodiments.

FIG. 1 shows an exemplary system 100 according to embodiments of the present teachings. In embodiments as shown, a client 102 can communicate with a set of hosts 116 through a network 114. The client 102 can be a computer, network-enabled cellular telephone, personal digital assistant, or other network-enabled device. Network 114 can comprise the Internet, private networks, or other networks or connections. The set of hosts 116 can include one or more Web sites, servers, or hosts.

The set of hosts 116 can host or serve Web applications or Web services. Those Web applications or services can include, for example, email accounts and files, word processing accounts and files, search tools and files related to search activity, database accounts and files, or other applications or services. The set of hosts 116 in embodiments can comprise free or commercial application service providers (ASPs) or other portals. The applications and services provided by set of hosts 116 can be programmed or served in Java code or script, Perl code or script, Dynamic HTML (hyper text markup language), XML (extensible markup language), SOAP (service oriented architecture protocol), Ajax, or other code or platforms. The applications and services hosted by the set of hosts 116 can be accessed by client 102 via a Web API, or other programming interface. The set of hosts 116 can each locally store one or more user files in local databases or networked servers, or other storage. Exemplary host applications or services include the commercially available Google™Docs word processing, spreadsheet, and presentation Web application, the Facebook™ personal networking site, and the Flickr™ digital photography file sharing service.

The client 102 can include local storage 104 and an operating system 106. Local storage 104 can include hard disk, optical, or electronic memory or storage. Operating system 106 can be a Linux™ distribution or other open-source operating system or platform, or a proprietary operating system. Operating system 106 can present a user interface 132 on a display 110. The user interface 132 can be a graphical user interface, for instance including a user desktop displaying applications, files, and other resources.

The client 102 can include a file usage aggregator module 108. The file usage aggregator module 108 can be integrated in operating system 106, or in embodiments can be separate from operating system 106. File usage aggregator module 108 can receive local usage data 118 indicating the history and usage of local files stored on local storage and accessed by client 102. Local usage data 118 can include data such as file name, file size information, file type information, date created information, date last accessed information, date last modified information, total file editing time information, file history information, file comment information, and file owner information. Local usage data 118 can include other data, metadata, or other information related to local files stored on local storage 104. In embodiments, file usage aggregator module 108 can interrogate operating system 106 to retrieve local usage data 118 directly or via an API. For example, in the publicly available Fedora Linux™ distribution, a file called ".recently-used.xbel" located in the user home directory can be accessed and its content can be parsed to extract information about recently used files. Other mechanisms can be used.

File usage aggregator module 108 can also communicate with the set of hosts 116 via network 114, and receive remote usage data 120 related to user files stored in or by associated host applications or services. Remote usage data 120 can include the same or similar types of information as the information stored in local usage data 118, including file name, file size information, file type information, date created information, date last accessed information, and the like. Remote usage data 120 can be delivered to file usage aggregator module 108 via HTTP (hyper-text transfer protocol) responses from Web services in an RSS (Really Simple Syndication) or Atom feed format, or other channels or connections. In embodiments, remote usage data 120 can be received from more than one host in the set of hosts 116, for combination together with other remote usage data along with local usage data. File usage aggregator module 108 can refresh or receive local usage data 118 and remote file usage data 120 at predetermined update periods, when notified of updates to file usage data, or at other times.

In embodiments in one regard, file usage aggregator module 108 can thereby receive both local usage data 118 and remote file usage data 120, and aggregate that information to display to the user via a file browser 112 in user interface 132. File usage aggregator module 108 can, in general, compare and combine file information contained in local usage data 118 and remote file usage data 120 to generate combined usage data 122 reflecting an overall order of file usage activity. File usage aggregator module 108 can present the resulting combined usage data 122 to the user in file browser 112, in one unified view, regardless of source and without the user needing to remember the source or path name of individual files to retrieve them.

Figure 2:
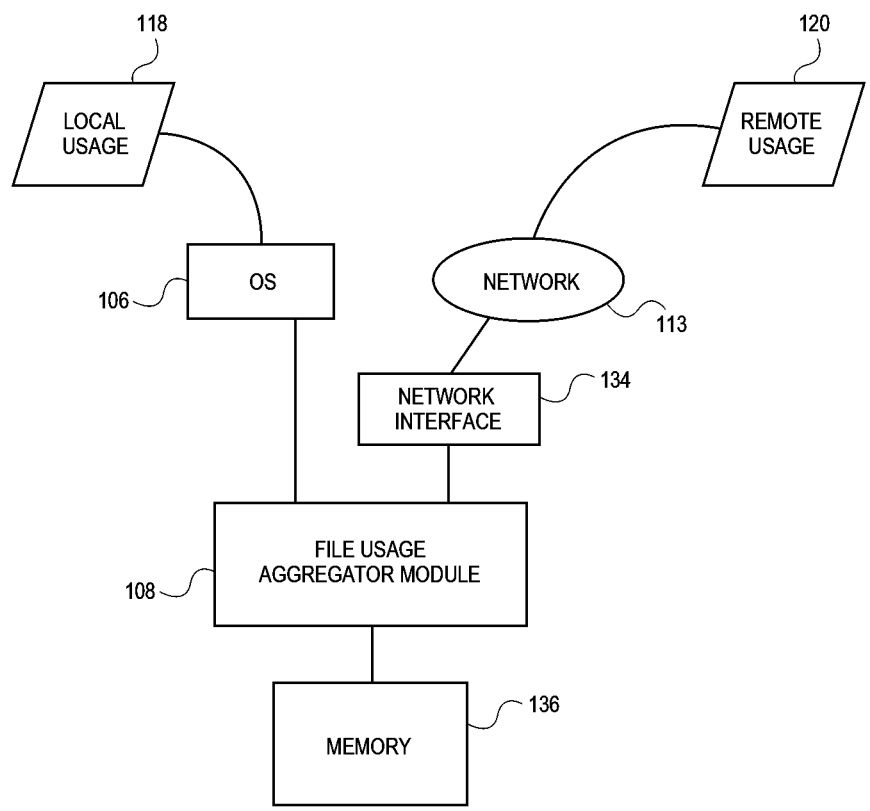
FIG. 2 illustrates a diagram of a configuration of a file usage aggregator module, according to various embodiments.

FIG. 2 illustrates a configuration of file usage aggregator module 108. File usage aggregator module 108 as shown can be connected to memory 136 of client 102. Memory 136 can comprise electronic memory such as random access memory (RAM). File usage aggregator module 108 can also be connected to a network interface 134, such as an Ethernet connection, cable modem, or other wired, wireless, or optical connection to network 114. File usage aggregator module 108 can receive remote file usage data 120 from set of hosts 116 over network 114 via network interface 134. File usage aggregator module 108 can also communicate internally with operating system 106, to receive local file usage data 118 based on files stored in local storage 104 of client 102. Other configurations of file usage aggregator module 108 are possible.

Figure 3:
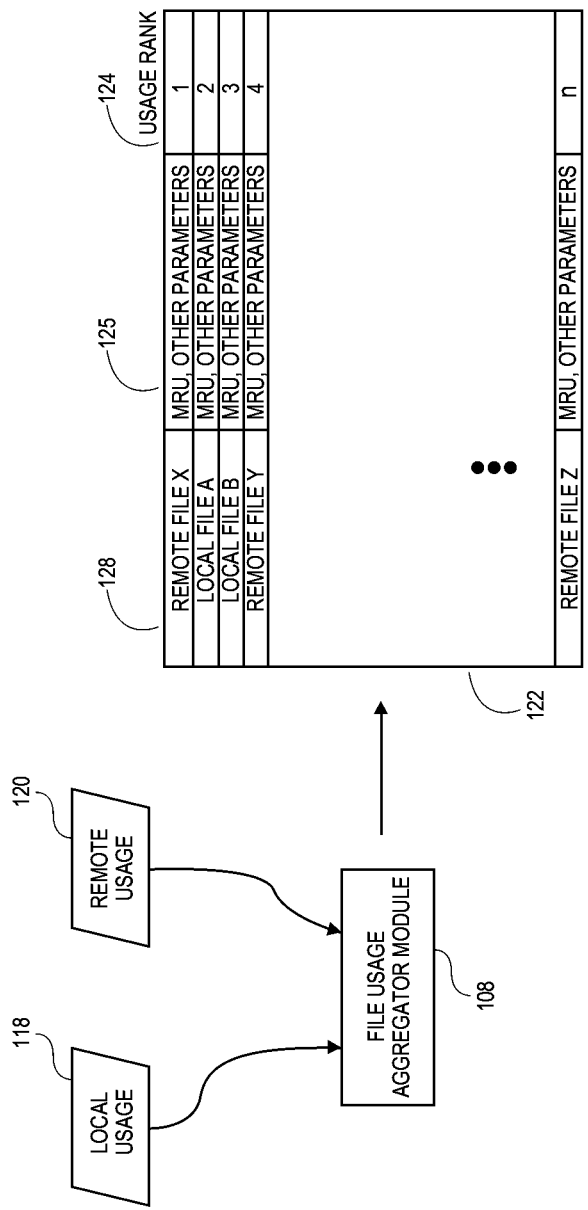
FIG. 3 illustrates aggregation of local and remote file usage information, according to various embodiments.

In terms of aggregation of file activity information, as shown in FIG. 3, file usage aggregator module 108 can receive local usage data 118 and remote file usage data 120 and compare and combine information in those file usage records to generate combined usage data 122. File usage aggregator module 108 can examine file usage parameters 126 contained in each of local usage data 118 and remote file usage data 120 to sort the set of combined files.

File usage aggregator module 108 can, for example, obtain most-recent activity information for each file in local usage data 118 and remote file usage data 120 by selecting the latest of the file's date last accessed, date last modified, and date created information. File usage aggregator module 108 can then use that information to compare and sort the files, and generate file selector list 128 based on usage rank 124 arranged in (descending) MRU order, taking both local and remote files into account. In embodiments, the combined files in file selector list 128 or other objects can be sorted based on one or more file usage parameters 126, in addition to or other than MRU data. For example, files can be sorted in usage rank 124 according to which files have received the most editing time in the last day, week, or other time period. Files can also be sorted according to the last modified date or created date alone, without combining those parameters in MRU order. Files can likewise be sorted by file name. In embodiments, file usage aggregator module 108 can store combined usage data 122 to local storage 104 of client 102, or other storage location.

Figure 4:
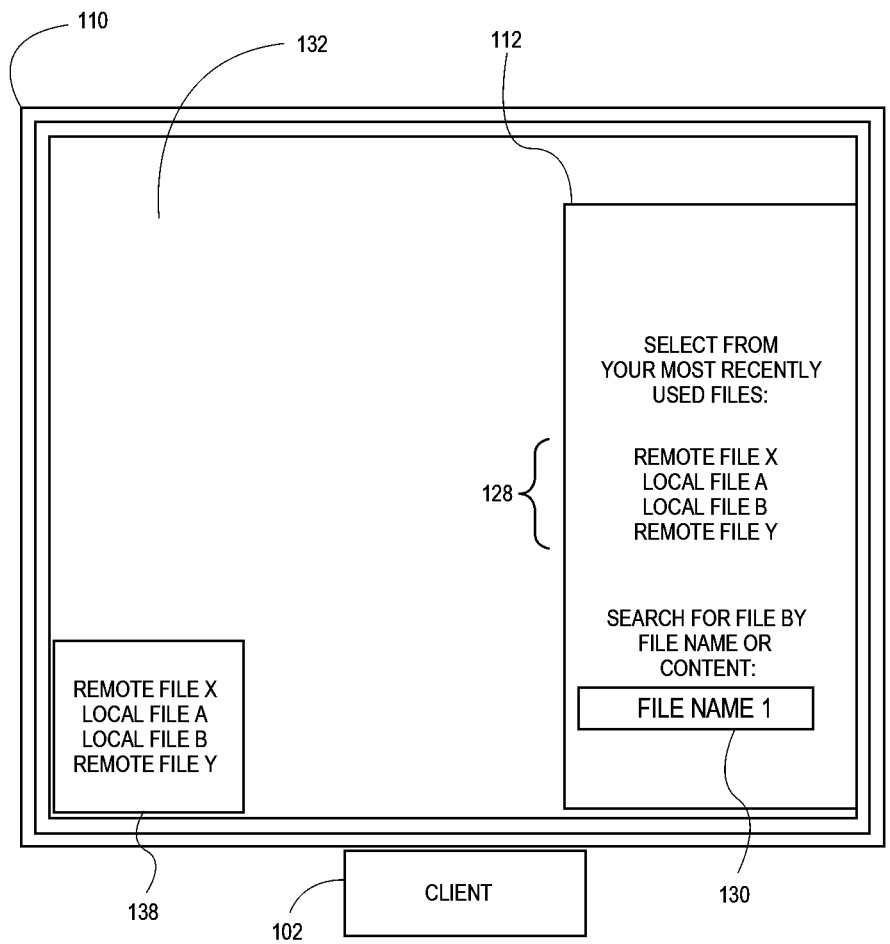
FIG. 4 illustrates a file browser displaying combined file usage information, according to various embodiments.

In embodiments as shown in FIG. 4, once file usage aggregator module 108 generates combined usage data 122, the file selector list 128 and other information can be presented to the user in file browser 112. The file browser 112 can be displayed on display 110 as a popup window, taskbar icon, or other widget or display. The user can select one or more files shown in file selector list 128 for use, for instance by moving a cursor over a desired file name and clicking a mouse. In embodiments, selecting a file from file selector list 128 can automatically open the file, using an application (e.g., email client or word processing application) associated with the file type of the selected file. The selection of any file in file selector list 128 can be transparent to the user with regard to local or remote location. The file browser 112 therefore presents the user with a unified view of their local and remote file for convenient browsing and selection, in combined order of most recent use. The file selector list 128 also therefore captures the user's actual file access patterns based on the user's complete work space, as opposed to separate views of local file usage and remote file usage.

In embodiments as also shown in FIG. 4, the file browser 112 can include a search tool 130 that presents the user with a dialog box to enter search criteria. The search tool 130 can execute searches on the combined usage data 122. The search criteria can include search strings such as file names, textual search terms to locate within files, or other search information. File usage aggregator module 108 can receive the entered search criteria and search combined usage data 122 to locate matching local or remote files, on a combined basis. Any matching files can be presented in file selector list 128, or in another list or output. The user can then select any matching files from the search results to open and use.

In embodiments, the user can configure preferences for file browser 112. For example, the maximum number of local, remote, or combined files to be retrieved or presented in file selector list 128 can be set by the user. In further embodiments, all local and remote files may be included in file selector list 128. In embodiments, the files to be displayed in file selector list 128 can also be limited by date created, date most recently used, or other user-selectable criteria.

The file browser 112 can present the user with options to perform various actions with the files presented in file selector list 128, including to copy or move files between local and remote storage. File browser 112 can also for example include options to select which application to open a file with, an ability to copy or move a file to different locations, an ability to drag a file to the desktop or another folder, an ability to rename a file, an ability to compare or merge files, an ability to mail a file as an attachment, or other actions similar to those available in conventional file browsers. File browser 112 can further allow opening a remote file in a local application, to facilitate working on the file during periods with no network access, such as an airplane trip, or in other situations when it is convenient. File browser 112 can conversely allow opening a local file in an on-line application, to facilitate identification of files stored locally that can be moved to a remote storage. Other types of file manipulation are possible.

In embodiments, in addition to being viewable in a full-function file browser 112, a selected number of sorted files from local and remote sources can be shown in a desktop sidebar 138, or other visible or readily accessible selected area or part of the user interface 132 of client 102. Providing a desktop sidebar 138 allows the user to return to working with those files simply by performing a single-click selection, once the client 102 is turned on. Some actions available in file browser 112, such as an ability to select which application to open a file with and an ability to rename the file, can be available in desktop sidebar 138, as well.

Figure 5:
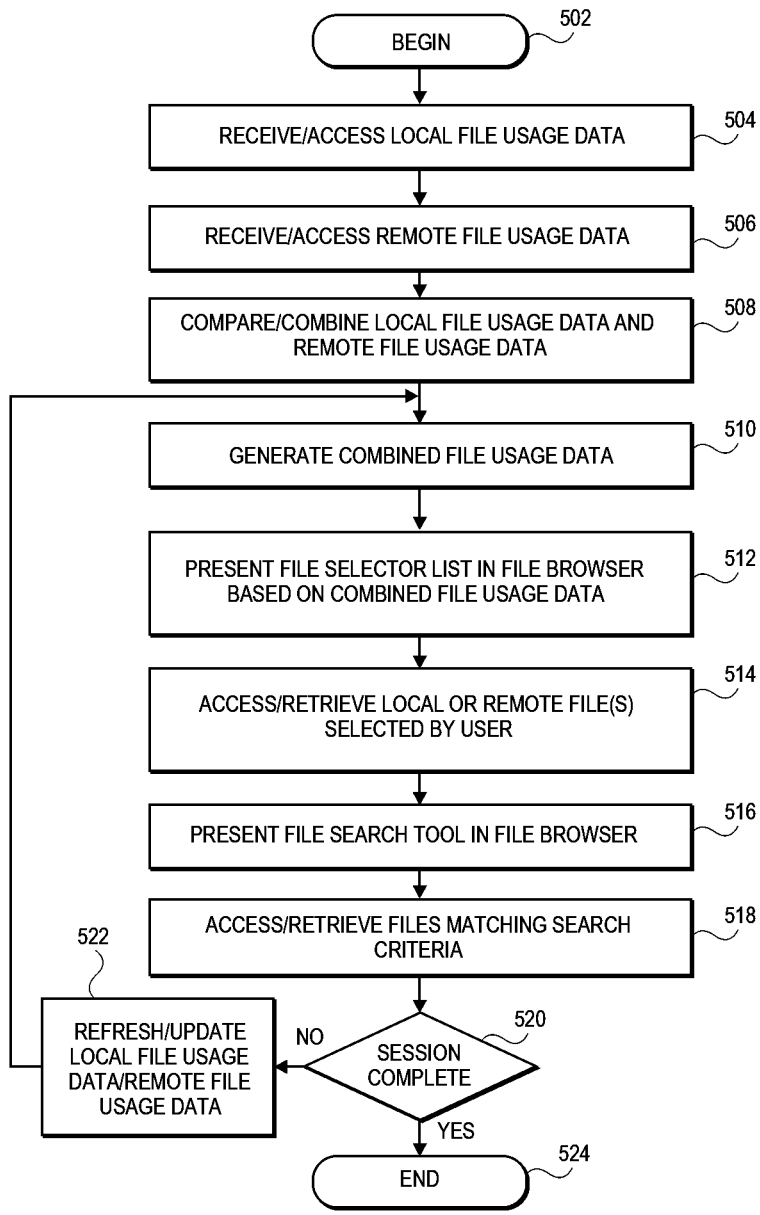
FIG. 5 illustrates overall file usage processing, according to various embodiments.

FIG. 5 illustrates overall file usage processing, according to embodiments. In step 502, processing can begin. In step 504, local file usage data 118 can be accessed or received by file usage aggregator module 108. Local file usage data 118 can be received, for example, by interrogating operating system 106 of client 102. In step 506, remote file usage data 120 can be accessed or received by file usage aggregator module 108. Remote file usage data 120 can be received, for example, from a set of hosts 116 such as Web-based or Web-hosted services or applications. The remote file usage data 120 can be received via HTTP responses from Web services in an RSS or Atom feed format, or other channel or connection.

In step 508, file usage aggregator module 108 can combine local file usage data 118 and remote file usage data 120. The local and remote usage data can be combined, for example, by merging the lists of files from the local and remote sources according to their file usage parameters 126 on a combined basis. For example, file usage aggregator module 108 can compare MRU values for all files, and the files can be compiled in an interleaved usage rank 124 that lists local and remote files in descending order starting with most recent use. Other file usage data in file usage parameters 126 as well as further file information such as name, path, or local or remote source can be used to sort or combine local file usage data 118 and remote file usage data 120.

In step 510, file usage aggregator module 108 can generate combined usage data 122 based on the results of the combination or analysis of local file usage data 118 and remote file usage data 120. In step 512, file browser 112 can present a file selector list 128 based on usage rank 124. In step 514, any files from file selector list 128 that are selected by the user can be accessed and retrieved, from local storage 104 and/or from set of hosts 116. In step 516, the file browser 112 can present a file search tool 130 to the user. File search tool 130 can include an input box or other selector or interface to permit the user to enter search strings such as file names, or to enter other search criteria. In step 518, file search tool 130 can access or retrieve files that match any entered user search criteria, likewise from local storage 104 and/or from set of hosts 116. In step 520, file usage aggregator module 108 or other logic can make a determination whether the current file usage session is complete. If the file usage session is not complete, processing can proceed to step 522 where file usage aggregator module 108 can access or receive refreshed or updated local file usage data 118 and remote file usage data 120. Processing can then return to step 510, where combined usage data 122 can be updated.

If the determination in step 520 is that file usage session is complete, processing can proceed to step 524. In step 524 processing can repeat, return to an earlier processing point, jump to a further processing point, or end.

The foregoing description is illustrative, and variations in configuration and implementation may occur to persons skilled in the art. For example, while embodiments have been described in terms of file usage aggregator module 108 residing in client 102, in embodiments file usage aggregator module 108 can reside in a remote server or site, and interrogate client 102 and set of hosts 116 to generate combined usage data 122. Likewise, in embodiments combined usage data 122 can be stored to client 102, to remote sites, or to both local and remote sites. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:

causing, by a client processing device, presentation of a merged list of unified file usage information, wherein the merged list of unified file usage information comprises a first representation of a local file associated with local file usage information and a second representation of a Web application file associated with remote file usage information from a remote network host, and wherein the merged list of unified file usage information is presented according to one or more preferences, the one or more preferences comprising a maximum number of representations of local and Web application files presented in the merged list;

receiving a selection of at least one of the local file or the Web application file from the merged list of unified file usage information;

determining, using saved preference information, a default application with which to open the at least one of the local file or the Web application file; and responsive to a request, opening the at least one of the local file or the Web application file with an application other than the default application, wherein opening the at least one of the local file or the Web application file with an application other than the default application comprises at least one of opening the local file with a Web application or opening the Web application file with a local application.

2. The method of claim 1, further comprising:

causing presentation of a plurality of selectable options for the merged list of unified file usage information, the plurality of selectable options comprising one or more of: selecting an application with which to open one of the local file or the Web application file, copying or moving one of the local file or the Web application file to a different location, renaming one of the local file or the Web application file, or comparing or merging the local file and the Web application file.

3. The method of claim 1, wherein the merged list of unified file usage information comprises a plurality of representations of local and Web application files arranged in a descending most recently used order.

4. The method of claim 3, further comprising:

presenting a subset of the plurality of representations in a sidebar adjacent to the merged list of unified file usage information, the subset comprising representations of one or more highest ranked local and Web application files.

5. A client computing device comprising:

memory; and a client processing device coupled to the memory, the client processing device to:

cause presentation of a merged list of unified file usage information, wherein the merged list of unified file usage information comprises a first representation of a local file associated with local file usage information and a second representation of a Web application file associated with remote file usage information from a remote network host, and wherein the merged list of unified file usage information is presented according to one or more preferences, the one or more preferences comprising a maximum number of representations of local and Web application files presented in the merged list;

receive a selection of at least one of the local file or the Web application file from the merged list of unified file usage information;

determine, using saved preference information, a default application with which to open the at least one of the local file or the Web application file; and responsive to a request, open the at least one of the local file or the Web application file with an application other than the default application, wherein opening the at least one of the local file or the Web application file with an application other than the default application comprises at least one of opening the local file with a Web application or opening the Web application file with a local application.

6. The client computing device of claim 5, wherein the client processing device further to:

cause presentation of a plurality of selectable options for the merged list of unified file usage information, the plurality of selectable options comprising one or more of: selecting an application with which to open one of the local file or the Web application file, copying or moving one of the local file or the Web application file to a different location, renaming one of the local file or the Web application file, or comparing or merging the local file and the Web application file.

7. The client computing device of claim 5, wherein the merged list of unified file usage information comprises a plurality of representations of local and Web application files arranged in a descending most recently used order.

8. The client computing device of claim 7, wherein the client processing device further to:

present a subset of the plurality of representations in a sidebar adjacent to the merged list of unified file usage information, the subset comprising representations of one or more highest ranked local and Web application files.

9. A non-transitory computer-readable storage medium storing instructions that, when executed by a client processing device, cause the client processing device to:

cause presentation of a merged list of unified file usage information, wherein the merged list of unified file usage information comprises a first representation of a local file associated with local file usage information and a second representation of a Web application file associated with remote file usage information from a remote network host, and wherein the merged list of unified file usage information is presented according to one or more preferences, the one or more preferences comprising a maximum number of representations of local and Web application files presented in the merged list;

receive a selection of at least one of the local file or the Web application file from the merged list of unified file usage information;

determine, using saved preference information, a default application with which to open the at least one of the local file or the Web application file; and responsive to a request, open the at least one of the local file or the Web application file with an application other than the default application, wherein opening the at least one of the local file or the Web application file with an application other than the default application comprises at least one of opening the local file with a Web application or opening the Web application file with a local application.

10. The non-transitory computer-readable storage medium of claim 9, wherein the instructions further cause the client processing device to:

cause presentation of a plurality of selectable options for the merged list of unified file usage information, the plurality of selectable options comprising one or more of: selecting an application with which to open one of the local file or the Web application file, copying or moving one of the local file or the Web application file to a different location, renaming one of the local file or the Web application file, or comparing or merging the local file and the Web application file.

11. The non-transitory computer-readable storage medium of claim 9, wherein the merged list of unified file usage information comprises a plurality of representations of local and Web application files arranged in a descending most recently used order.

\* \* \* \* \*